United States Patent
Chiang et al.

(10) Patent No.: US 9,575,369 B2
(45) Date of Patent: Feb. 21, 2017

(54) MANUFACTURING METHOD FOR DISPLAY MODULE

(71) Applicant: E Ink Holdings Inc., Hsinchu (TW)

(72) Inventors: Ming-Sheng Chiang, Hsinchu County (TW); Chih-Cheng Wang, Tainan (TW); Chi-Ming Wu, Tainan (TW); Ta-Nien Luan, Hsinchu (TW); Shu-Ping Yan, Taipei (TW); Chin-Hsuan Kuan, Hsinchu (TW)

(73) Assignee: E INK HOLDINGS INC., Hsinchu (TW)

(*) Notice: Subject to any disclaimer, the term of this patent is extended or adjusted under 35 U.S.C. 154(b) by 317 days.

(21) Appl. No.: 14/264,726

(22) Filed: Apr. 29, 2014

(65) Prior Publication Data
US 2015/0076722 A1    Mar. 19, 2015

(30) Foreign Application Priority Data
Sep. 16, 2013    (TW) .............................. 102133494 A

(51) Int. Cl.
*G02F 1/1339*    (2006.01)
*G02F 1/1341*    (2006.01)

(52) U.S. Cl.
CPC ........... *G02F 1/1339* (2013.01); *G02F 1/1341* (2013.01); *G02F 2201/56* (2013.01)

(58) Field of Classification Search
CPC .............................. G02F 1/1339; G02F 1/1341
See application file for complete search history.

(56) References Cited

U.S. PATENT DOCUMENTS

| | | | |
|---|---|---|---|
| 8,304,873 B2 | 11/2012 | Okabe et al. | |
| 2009/0015779 A1* | 1/2009 | Ohashi | G02F 1/1341 349/154 |
| 2011/0128608 A1 | 6/2011 | Hsiao et al. | |
| 2013/0235321 A1* | 9/2013 | Hirano | G02F 1/1339 349/190 |

FOREIGN PATENT DOCUMENTS

| | | |
|---|---|---|
| TW | 201117158 A | 5/2011 |
| TW | 201215982 A | 4/2012 |

OTHER PUBLICATIONS

Taiwanese Office Action dated Apr. 15, 2015.

* cited by examiner

*Primary Examiner* — Erin Snelting
(74) *Attorney, Agent, or Firm* — Rabin & Berdo, P.C.

(57) ABSTRACT

A manufacturing method for a display module is provided. The method comprises following steps. A module structure comprising a cover plate, a substrate, and a front plate disposed between the cover plate and the substrate is provided. A space is defined by a lower surface of the cover plate, an upper surface of the substrate, and a side surface of the front plate. A holding structure comprising a holding layer disposed under the module structure is provided. A sealant is filled into the space. Portions of the package layer and the holding structure disposed outside a side surface of the cover plate and a side surface of the substrate are removed.

5 Claims, 4 Drawing Sheets

MANUFACTURING METHOD FOR DISPLAY MODULE

This application claims the benefit of Taiwan application Serial No. 102133494, filed Sep. 16, 2013, the subject matter of which is incorporated herein by reference.

BACKGROUND OF THE INVENTION

Field of the Invention

The invention relates in general to a manufacturing method for a display module, and more particularly to a manufacturing method in which sealant is used for packaging display module.

Description of the Related Art

Along with the advance in flat panel display technology, more and more electronic products, particularly, portable electronic products, such as mobile phone, e-book apparatus, digital cameras, and personal digital assistant (PDA), are equipped with display device. Since the design of portable electronic products is directed towards lightweight, small volume and slimness and thinness, the display devices using portable electronic products also need to possess the features of lightweight, small volume and slimness and thinness.

Display devices, such as flexible electrophoretic display (flexible EPD) and flexible liquid crystal display (flexible LCD), further possess flexibility and break proof in addition to the features of lightweight, small volume, slimness and thinness.

A module packaging requires a reserved width, hence restricting the development is in slim bezel of display devices.

SUMMARY OF THE INVENTION

The invention is directed to a manufacturing method for a display module capable of achieving slim bezel.

According to one embodiment of the present invention, a manufacturing method for a display module is provided. The method comprises following steps. A module structure comprising a cover plate, a substrate, and a front plate disposed between the cover plate and the substrate is provided. A space is defined by a lower surface of the cover plate, an upper surface of the substrate, and a side surface of the front plate. A holding structure comprising a holding layer disposed under the module structure is provided. A sealant is filled into the space. Portions of the package layer and the holding structure disposed outside a side surface of the cover plate and a side surface of the substrate are removed.

According to another embodiment of the present invention, a manufacturing method for a display module is provided. The method comprises following steps. An electronic ink layer is disposed on a substrate. A protection film is disposed on the electronic ink layer. A space is defined by a lower surface of the protection film, a side surface of the electronic ink layer and an upper surface of the substrate. A blocking film is disposed on the substrate. The electronic ink layer and the protection film are disposed in a pattern opening of the blocking film, and the space is interconnected with the pattern opening. A sealant is filled into the space from the pattern opening disposed outside a side surface of the protection film. The blocking film disposed outside the side surface of the protection film and portions of the sealant and the substrate are removed.

The above and other aspects of the invention will become better understood with regard to the following detailed description of the preferred but non-limiting embodiment (s). The following description is made with reference to the accompanying drawings.

DETAILED DESCRIPTION OF THE INVENTION

Figure 1A:
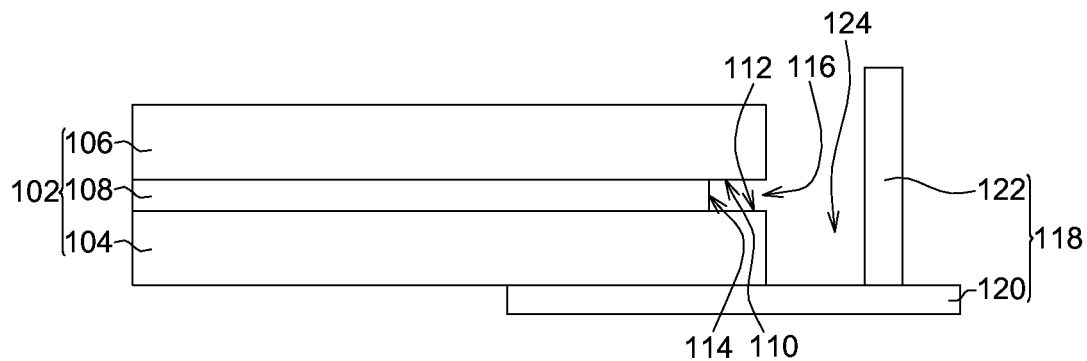
FIG. 1A to FIG. 1C illustrate a process of a manufacturing method for a display module according to an embodiment.
Figure 1B:
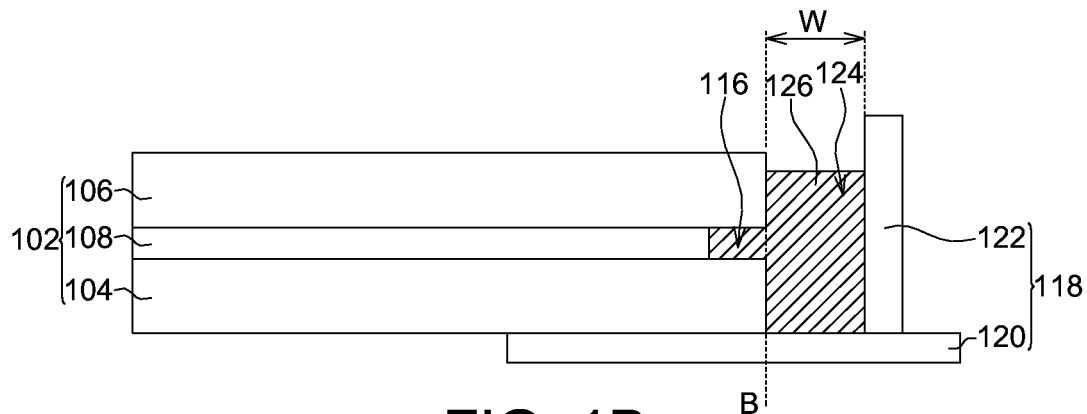
Figure 1C:
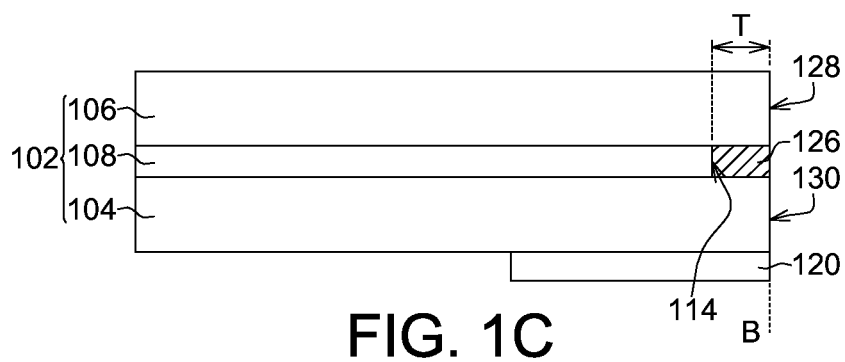

FIG. 1A to FIG. 1C illustrate a process of a manufacturing method for a display module according to an embodiment.

Referring to FIG. 1A, a module structure 102 is provided. The module structure 102 comprises a substrate 104, a cover plate 106, and a front plate 108 disposed between the cover plate 106 and the substrate 104. In an embodiment, the substrate 104 is realized by a transparent glass substrate on which a thin-film transistor array (that is, an array substrate) is disposed. The cover plate 106 may comprise transparent glass or polymer such as polystyrene (PS), etc. A space 116 is defined by a lower surface 110 of the cover plate 106, an upper surface 112 of the substrate 104, and a side surface 114 of the front plate 108.

Referring to FIG. 1A, a holding structure 118 is provided, wherein the holding structure 118 comprises a holding layer 120 on which the module structure 102 is disposed. The holding structure 118 further comprises a retaining wall 122, which can be bonded on the holding layer 120 or integrally formed in one piece with the holding layer 120. A recess 124 is defined by the module structure 102, and the retaining wall 122 and the holding layer 120 of the holding structure 118, and the recess 124 is interconnected with the space 116. The holding layer 120 and the retaining wall 122 can be formed by a polymeric plastic material comprising for example polyethylene terephthalate (PET), polystyrene (PS), polycarbonate (PC), etc.

Referring to FIG. 1B, a sealant 126 is filled into the space 116. In an embodiment, the sealant 126 is coated onto the holding layer 120 from the recess 124, wherein the sealant 126 is accumulated from the holding layer 120 and an amount of the holding layer 120 suffices to be filled into the space 116. An exposed width W of the recess 124 can be adjusted according to actual needs (such as the accuracy of filling the sealant into the machine, the degree of error in manual filling, and the viscosity of the sealant 126, etc). In the present embodiment, the recess 124 can be designed to have a smaller exposed width W, so that the required amount of the sealant 126 for filling up the space 116 can be reduced. Therefore, the holding structure 118 provides a coating platform through which the sealant 126a can be more accurately and effectively filled into the space 116 without being wasted, so as to increase product reliability and reduce manufacturing cost. The sealant 126 can be realized by a thermoplastic sealant, a thermosetting sealant, an ultraviolet (UV) curable sealant or a room temperature polymer curing sealant, but is not limited thereto.

In another embodiment, the holding structure 118 omits the retaining wall 122, and the sealant 126 is provided to the holding layer 120 along an outer edge of the cover plate 106. With sufficient amount of viscous and adhesive sealant 126, the sealant 126 can be accumulated from the holding layer 120 and further filled into the space 116. In the present embodiment, the holding layer 120 of the holding structure 118 provides a coating platform through which the sealant 126 can be more accurately and effectively filled into the space 116 without being wasted, so as to increase product reliability and reduce manufacturing cost.

Then, the sealant 126 may be cured.

Referring to FIG. 1C, portions of the sealant 126 and the holding structure 118 disposed outside a side surface 128 of the cover plate 106 and a side surface 130 of the substrate 104 are removed. In an embodiment, the removal step is performed by laser cutting. The heat generated by laser can melt the cured sealant 126 which adheres the substrate 104, the cover plate 106 and the front plate 108 together more tightly, hence increasing the packaging effect of the sealant 126, effectively blocking external influence (such as water vapor), and increasing product reliability. Following the removal step, the display module will possess the features of slim bezel and excellent product reliability. In an embodiment, a width T of the sealant 126 can be designed to be smaller than or equal to 0.3 mm. In an embodiment, the sealant 126 can be cured after laser cutting step.

In an embodiment, following the step as disclosed in FIG. 1O, the residual portion of the holding structure 118 (that is the residual holding layer 120 as indicated in FIG. 1O) can be removed at suitable timing. That is, the holding structure 118 is a temporary supplementary structure during the manufacturing process. If the residual portion of the holding structure 118 does not affect subsequent process of manufacturing the display module, the residual portion of the holding structure 118 can be reserved till the final display product.

According to the above embodiments, the side surface 130 of the substrate 104 can be substantially aligned with the side surface 128 of the cover plate 106 (as indicated by a dotted line B), and a distance from the side surface 114 of the front plate 108 to the side surface 130 of the substrate 104 or to the side surface 128 of the cover plate 106 is equal to the width T of the sealant 126. Thus, slim bezel can be achieved, and the distance from the side surface 114 of the front plate 108 to the side surface 130 of the substrate 104 or to the side surface 128 of the cover plate 106 is reduced to be smaller than or equal to 0.3 mm.

FIG. 2A-1 to FIG. 2C-2 illustrate a process of a manufacturing method for a display module according to another embodiment. FIG. 2A-1, FIG. 2B-1 and FIG. 2C-1 respectively are cross-sectional views along a cross-sectional line AA of FIG. 2A-2, FIG. 2B-2 and FIG. 2C-2 (top views).

Figures 1, 2A:
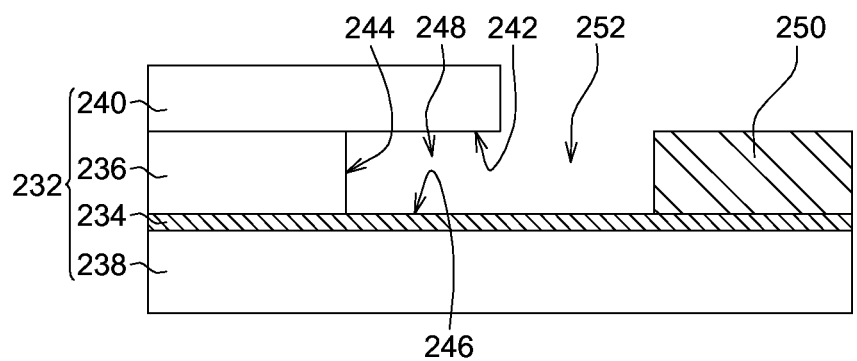
FIG. 2A-1 to FIG. 2C-2 illustrate a process of a manufacturing method for a display module according to another embodiment.

Referring to FIG. 2A-1, a module structure 232 is provided. The module structure 232 comprises a substrate 234 and an electronic ink layer 236 disposed on the substrate 234. In an embodiment, the substrate 234 is realized by a flexible substrate. The module structure 232 may further comprise a protection film 238 disposed under the substrate 234. The module structure 232 may further comprise a protection film 240 disposed on the electronic ink layer 236. A space 248 is defined by a lower surface 242 of the protection film 240, a side surface 244 of the electronic ink layer 236 and an upper surface 246 of the substrate 234.

Figures 2, 2A:
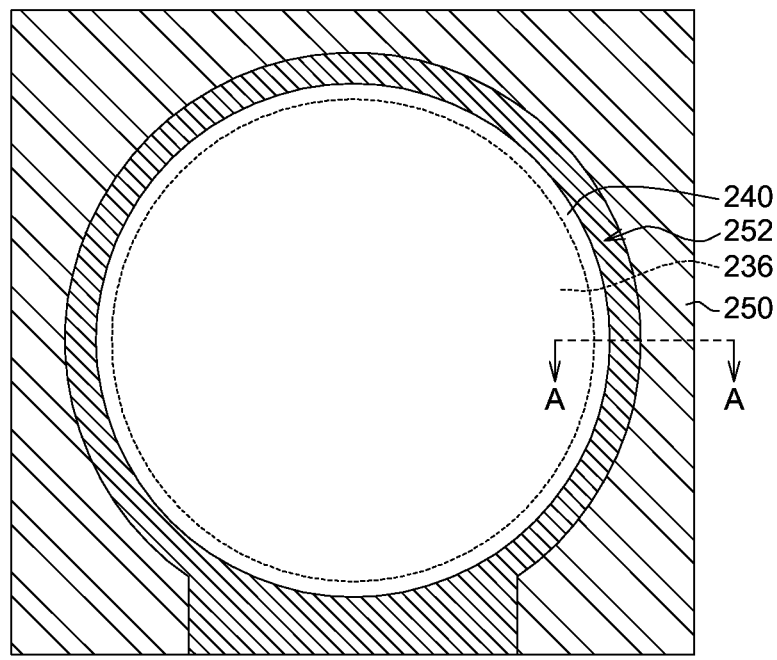

Referring to FIG. 2A-1 and FIG. 2A-2, a blocking film 250 is disposed on the substrate 234. The blocking film 250 has a pattern opening 252 formed for example by way of hollowing the blocking film 250. The pattern opening 252 capable of accommodating the electronic ink layer 236 and the protection film 240 is interconnected with the space 248 (FIG. 2A-1). A shape of a portion of the pattern opening 252 substantially corresponds to a shape of the protection film 240 and/or the electronic ink layer 236, such as a circular shape portion as indicated in FIG. 2A-2. In an embodiment, the blocking film 250 is realized by flexible plastics. For instance, the blocking film 250 comprises a polyester film or other suitable materials.

Figures 1, 2B:
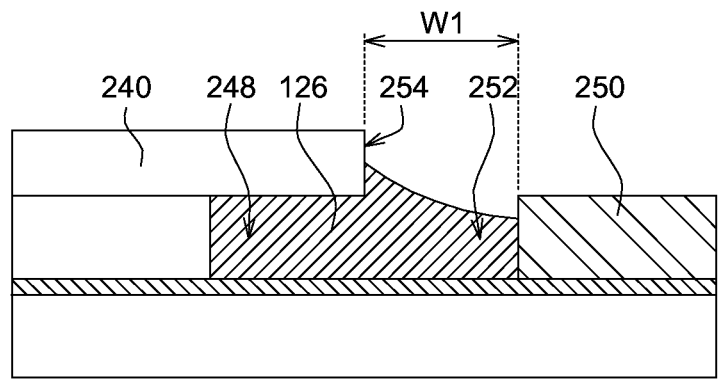
Figures 2, 2B:
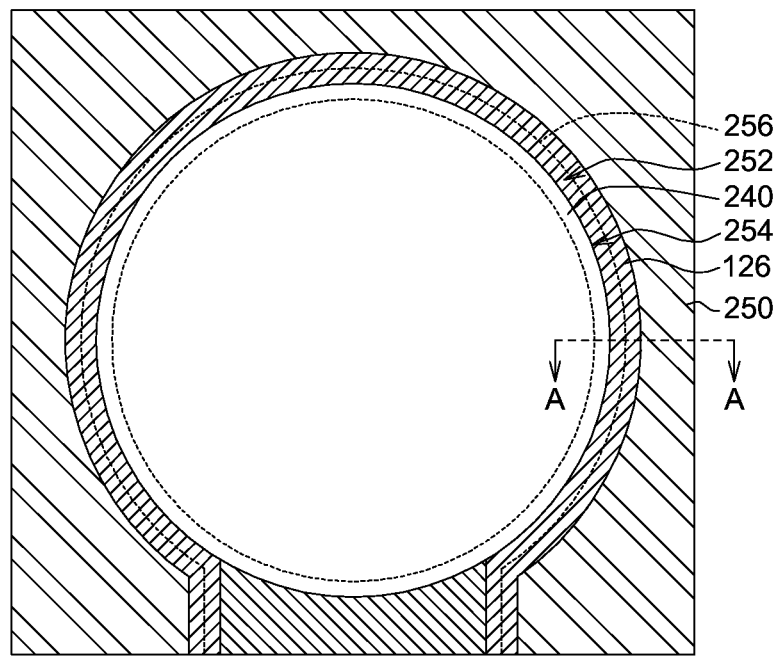

Referring to FIG. 2B-1 and FIG. 2B-2, the sealant 126 can be disposed along an edge of the pattern opening 252, wherein the sealant 126 in the pattern opening 252 outside a side surface 254 of the protection film 240 is filled into the space 248 (FIG. 2B-1). In an embodiment, the exposed portion of the pattern opening 252 can be designed to have a small exposed width W1 (for instance, by designing the pattern opening 252 to have similar shape and/or dimension with that of the protection film 240), such that the required amount of the sealant 126 for filling up the space 248 can be reduced. The pattern opening 252 restricts the coating area of the sealant 126, such that the sealant 126 can be accurately and effectively filled into the space 248 without being wasted, not only increasing product reliability but also saving manufacturing cost.

Then, the sealant 126 may be cured.

Figures 1, 2C:
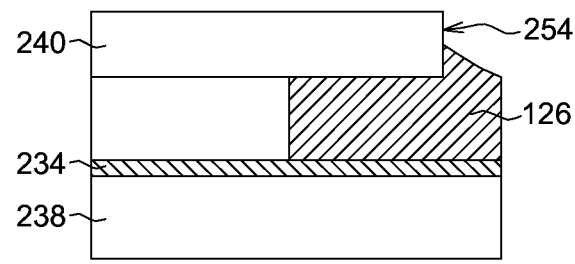
Figures 2, 2C:
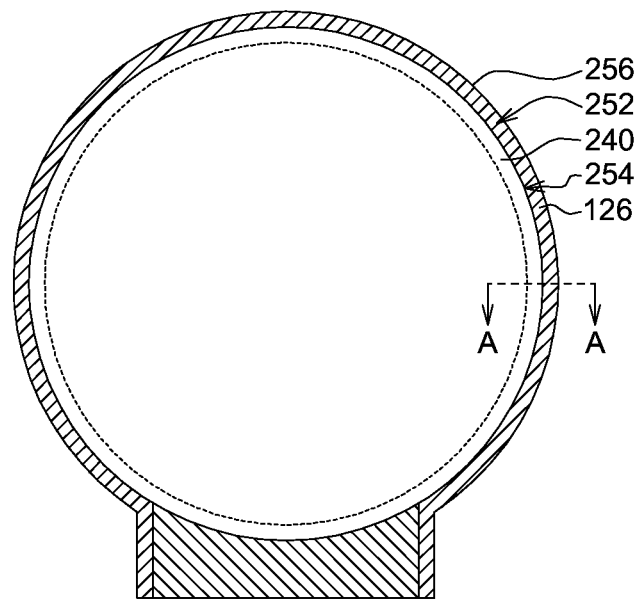

Referring to FIG. 2C-1 and FIG. 2C-2, the blocking film 250 (FIG. 2B-1 and FIG. 2B-2) and portions of the sealant 126, the substrate 234 (FIG. 2C-1) and the protection film 238 (FIG. 2C-1) outside the side surface 254 of the protection film 240 are removed. In an embodiment, the removal step is performed by laser cutting along an edge of the pattern opening 252 (such as along the cutting path 256 as indicated in FIG. 2B-2). After the removal step, the display module possesses the feature of slim bezel. In an embodiment, following the laser cutting step, the sealant 126 can be cured. The sealant 126 effectively blocks external influence and prevents the electronic ink layer 236 from being affected by external factors (such as water vapor) and increases product reliability. In the laser cutting step, the cutting path can be realized by any cross section between the side surface 254 of the protection film 240 and the blocking film 250. In another embodiment, based on the design needs, the module structure can be cut downwards along an edge of the side surface 254 of the protection film 240 or in a direction towards the protection film 238 from the inner side surface of the blocking film 250.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A manufacturing method for a display module, comprising:
   providing a module structure comprising a cover plate, a substrate, and a front plate disposed between the cover plate and the substrate, wherein a space is defined by a lower surface of the cover plate, an upper surface of the substrate, and a side surface of the front plate;
   providing a holding structure comprising a holding layer disposed under the module structure;
   filling a sealant into the space; and
   removing portions of the sealant and the holding structure outside a side surface of the cover plate and a side surface of the substrate.

2. The manufacturing method for a display module according to claim 1, wherein the holding structure further comprises a retaining wall erected on the holding layer, a recess is defined by the module structure and the retaining wall and the holding layer of the holding structure and the recess is interconnected with the space, and the sealant is provided to the holding layer from the recess so as to fill into the space.

3. The manufacturing method for a display module according to claim 1, further comprising curing the sealant before said removing portions of the sealant and the holding structure.

4. The manufacturing method for a display module according to claim 1, wherein the sealant and the holding structure are removed by laser.

5. The manufacturing method for a display module according to claim 1, further comprising removing a residual portion of the holding structure after removing the portions of the sealant and the holding structure disposed outside the side surface of the cover plate and the side surface of the substrate.

\* \* \* \* \*